(12) United States Patent
Burger

(10) Patent No.: US 9,556,768 B2
(45) Date of Patent: Jan. 31, 2017

(54) DEVICE AND METHOD FOR METERING A LIQUID INTO THE EXHAUST TRACT OF AN INTERNAL COMBUSTION ENGINE

(75) Inventor: Matthias Burger, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 261 days.

(21) Appl. No.: 13/702,887

(22) PCT Filed: May 19, 2011

(86) PCT No.: PCT/EP2011/058114
§ 371 (c)(1),
(2), (4) Date: Dec. 7, 2012

(87) PCT Pub. No.: WO2011/160898
PCT Pub. Date: Dec. 29, 2011

(65) Prior Publication Data
US 2013/0081377 A1    Apr. 4, 2013

(30) Foreign Application Priority Data
Jun. 22, 2010   (DE) .................. 10 2010 030 343

(51) Int. Cl.
*F01N 3/00*    (2006.01)
*F01N 3/20*    (2006.01)
(Continued)

(52) U.S. Cl.
CPC ............... *F01N 3/00* (2013.01); *F01N 3/2066* (2013.01); *F01N 3/36* (2013.01);
(Continued)

(58) Field of Classification Search
CPC ............ F01N 3/00; F01N 3/2066; F01N 3/36; F01N 2260/024; F01N 2610/02; F01N 2610/03; F01N 2610/11; F01N 2610/1453; F01N 2610/1473; F02M 53/043; F02M 61/08; F02M 61/20; F02M 63/0007; Y02T 10/24
(Continued)

(56) References Cited

U.S. PATENT DOCUMENTS 3,610,529 A * 10/1971 Huber .................. F02M 47/027
                                                                 239/124
3,797,753 A *  3/1974 Fenne .................... G08B 21/16
                                                                 239/533.8
(Continued)

FOREIGN PATENT DOCUMENTS

DE   102006019973   10/2007
DE   102007011686    9/2008
(Continued)

OTHER PUBLICATIONS

International Search Report for Application No. PCT/EP2011/058114 dated Aug. 19, 2011 (English Translation and Original, 6 pages).

*Primary Examiner* — Thomas Denion
*Assistant Examiner* — Matthew T Largi
(74) *Attorney, Agent, or Firm* — Michael Best & Friedrich LLP

(57) ABSTRACT

The invention relates to a device and method for metering a liquid, in particular a fuel, into an exhaust gas tract of an internal combustion engine, wherein the device comprises at least one injection valve that can be closed by a closing member and that has cooling circuit for regulating the temperature in the injection valve, and wherein a throttle element is connected upstream of the injection valve to control, by closed loop or open loop, the quantity of a volume flow of the liquid through the injection valve, in particular through the cooling circuit of the injection valve, wherein the injection valve opens when the throttle element (Continued)

de-throttles the volume flow of the liquid to the injection valve.

19 Claims, 4 Drawing Sheets

(51) Int. Cl.
    *F01N 3/36*     (2006.01)
    *F02M 53/04*     (2006.01)
    *F02M 61/08*     (2006.01)
    *F02M 61/20*     (2006.01)
    *F02M 63/00*     (2006.01)

(52) U.S. Cl.
    CPC .... *F01N 2260/024* (2013.01); *F01N 2610/02* (2013.01); *F01N 2610/03* (2013.01); *F01N 2610/11* (2013.01); *F01N 2610/1453* (2013.01); *F01N 2610/1473* (2013.01); *F02M 53/043* (2013.01); *F02M 61/08* (2013.01); *F02M 61/20* (2013.01); *F02M 63/0007* (2013.01); *Y02T 10/24* (2013.01)

(58) Field of Classification Search
    USPC .... 60/274, 286, 29, 320, 295; 137/489, 492, 137/488; 239/132.1–132.5, 124, 125
    See application file for complete search history.

(56) References Cited

U.S. PATENT DOCUMENTS

| | | | |
|---|---|---|---|
| 3,893,629 A * | 7/1975 | Okamoto | F02M 59/366 |
| | | | 239/583 |
| 4,216,912 A * | 8/1980 | Kopse | 239/533.4 |
| 4,261,513 A * | 4/1981 | Andrews | F02M 61/205 |
| | | | 239/125 |
| 5,263,645 A * | 11/1993 | Paul | F02M 47/027 |
| | | | 239/124 |
| 5,605,042 A | 2/1997 | Stutzenberger | |
| 5,829,688 A * | 11/1998 | Rembold et al. | 239/585.1 |
| 6,499,467 B1 * | 12/2002 | Morris | F02M 47/027 |
| | | | 123/446 |
| 8,047,452 B2 | 11/2011 | Martin et al. | |
| 8,646,475 B2 | 2/2014 | Jochumsen et al. | |
| 2006/0236679 A1 | 10/2006 | Meyer et al. | |
| 2008/0265065 A1 * | 10/2008 | Lander et al. | 239/585.4 |
| 2009/0229258 A1 * | 9/2009 | Zapf et al. | 60/295 |
| 2009/0230136 A1 * | 9/2009 | Dougnier et al. | 220/592.01 |

FOREIGN PATENT DOCUMENTS

| | | | | |
|---|---|---|---|---|
| WO | 2005/005799 | | 1/2005 | |
| WO | WO 2005005799 A1 * | | 1/2005 | F01N 3/20 |
| WO | 2008/058634 | | 5/2008 | |

\* cited by examiner

DEVICE AND METHOD FOR METERING A LIQUID INTO THE EXHAUST TRACT OF AN INTERNAL COMBUSTION ENGINE

BACKGROUND OF THE INVENTION

The invention proceeds from a device and a method for metering a liquid into the exhaust tract of an internal combustion engine according to the preamble of the independent claims.

For the aftertreatment of exhaust gases from an internal combustion engine, DE 44 36 397 B4 discloses the delivery by a delivery element of a liquid, for example liquid urea solution or fuel, from a reservoir to an injection valve, which meters a required quantity of the liquid into the exhaust tract. Here the injection valve is arranged on the exhaust tract in such a way that its injection orifice is directed into the exhaust tract.

In operation very high temperatures can occur on the injection valve, particularly at its injection orifice, due to hot exhaust gases in the exhaust tract. This negative effect may be further exacerbated by the need to arrange the injection valve in proximity to hot components, such as the internal combustion engine, for example, or an exhaust gas turbocharger. There is the risk here of an unwanted thermal decomposition of the liquid in the injection valve or a formation of deposits in the injection orifice of the injection valve. The metering accuracy of the injection valve may thereby be impaired, which in extreme cases can lead to failure of the injection valve.

In order to avoid these very high temperatures in the injection valve, DE 10 2007 011 686 A1 discloses an injection valve with cooling in the area of the injection orifice. In addition, DE 10 2006 019 973 A1 discloses a metering system for providing reducing agents in the exhaust tract, in which a metering valve of the metering system can be cooled by a cooling circuit.

SUMMARY OF THE INVENTION

The device according to the invention and the method according to the invention for metering a liquid into the exhaust tract of an internal combustion engine by contrast has the advantage that the injection valve opens when the restrictor element releases the volumetric flow of the liquid to the injection valve. This means that it is possible to adjust to any flow, however small, through the cooling circuit of the device, so that the cooling of the injection valve can be controlled as a function of the demand and does not always ensue at the maximum delivery of the pump. Less power is therefore needed in order to deliver the liquid through the injection valve, which leads to an increased efficiency of the internal combustion engine. In addition, a restrictor in the inlet to the injection valve gives the injection valve greater robustness to withstand pressure fluctuations in the liquid circuit upstream of the restrictor element, since such pressure fluctuations are damped by the restrictor element. Reducing such pressure fluctuations avoids injection control defects and leads to a higher metering accuracy of the injection valve.

In an advantageous development the injection valve comprises a further restrictor, arranged in the closing member, for example, which has a greater restricting effect than the restrictor element when the flow through the first restrictor element is fully opened. The further restrictor serves to limit the maximum cooling quantity through the cooling circuit of the injection valve, in particular the return quantity from the cooling circuit, so that, for example, a pressure can be built up in the injection valve.

In a further advantageous development a first operating state, in which the restrictor element determines the volumetric flow through the cooling circuit of the injection valve, is succeeded by a second operating state, in which a pressure of the liquid in the injection valve is increased when the volumetric flow to the injection valve is released and is restricted by the further restrictor in the injection valve, and the injection valve opens when a defined pressure level is reached. This development allows the injection valve to be designed as a pressure-controlled valve, which opens in excess of a defined pressure threshold. Here the pressure in the injection valve may be adjusted solely via the restrictor element, if the further restrictor has a fixed cross section and therefore from a certain release of the restrictor element onwards becomes the flow-determining restrictor of the cooling circuit.

In an advantageous embodiment of the device the closing member of the injection valve is embodied as a valve needle, in particular as a hollow needle. Designing the closing member as a valve needle allows a liquid return of the injection valve to be effected along the valve needle in the closing member, which return, in the case of a hollow needle, may be formed inside the hollow needle, so that the injection valve can be of very compact design.

In a further advantageous embodiment of the device the restrictor element comprises a metering element, for example a metering pump, in particular an electrically controlled metering pump, a variable restrictor and/or a metering valve. A metering pump is advantageous since it is capable of boosting the pressure acting on the liquid, so that the liquid can be injected at a higher injection pressure and can be atomized more finely.

In a particularly advantageous embodiment of the device the metering pump does not fully prevent the supply of liquid to the injection valve when the metering pump is in a deactivated operating state. This advantageously ensures that even with the metering pump deactivated liquid can be delivered through the injection valve for cooling purposes. Furthermore in the activated operating state the metering pump is capable of generating a pressure which exceeds the inlet pressure to the restrictor element and therefore leads to an excess pressure. The injection valve can therefore also be adjusted to opening pressures which exceed the inlet pressure to the restrictor element. The liquid supply to the restrictor element can thereby be of a particularly simple and cost-effective design, and this allows a connection to liquid circuits already existing, for example the low-pressure circuit of a fuel injection system.

In a further advantageous development the injection valve comprises a cooling circuit with a liquid inlet and a liquid return, the liquid return being arranged in an inner area of the injection valve, in particular inside the closing member. Arranging the liquid return in an inner area of the injection valve means that the heated liquid can be discharged from the cooling circuit of the injection valve over a relatively short distance, so that further heating of the liquid and possible thermal decomposition or ageing are minimized.

In a further advantageous development a filter element, for example a disk filter, is arranged in a housing of the injection valve, particularly in a liquid feed line to the cooling circuit. Incorporating a filter element in the injection valve serves to increase the robustness of the injection valve towards particles. With particles there is a risk of these particles being deposited in areas relevant to the functioning of the injection valve, in particular on the valve seat and in the further restrictor, and impairing the working of the valve or causing increased wear, and in extreme case particles may lead to a complete failure of the injection valve. The filter element reduces this risk, which leads to a longer service life and increased working accuracy over the operating life of the injection valve.

In a further advantageous embodiment of the device the cooling circuit of the injection valve cools an area of the injection valve facing the exhaust tract, in particular a valve seat. The cooling of the valve seat by the cooling circuit affords the advantage that it specifically cools precisely that point of the injection valve subjected to the greatest thermal load, in particular the area of the valve seat and the injection orifice, and therefore minimizes the risk of deposits on the valve seat and coking of the injection orifices.

BRIEF DESCRIPTION OF THE DRAWINGS

Exemplary embodiments of the invention are represented in the drawings and are explained in more detail in the following description.

DETAILED DESCRIPTION

Figure 1:
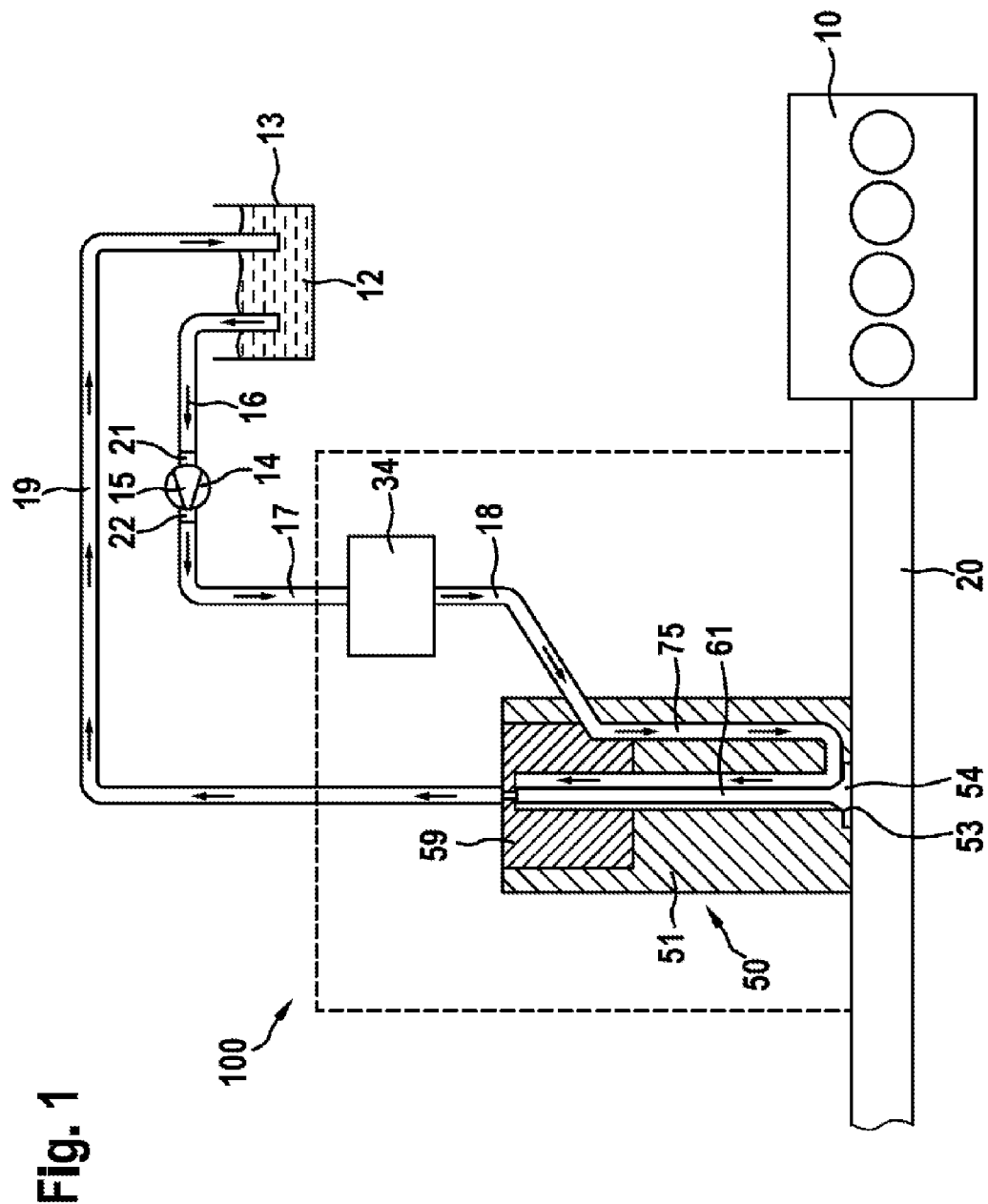
FIG. 1 shows a schematic representation of the device according to the invention for metering a liquid into the exhaust tract of an internal combustion engine.

FIG. 1 represents the device 100 according to the invention for metering a liquid 12 into an exhaust tract 20 of an internal combustion engine 10. The device 100 here comprises the components represented inside the dashed line.

A reservoir 13 for storing the liquid 12 is connected to a suction-side inlet 21 of a pump 14 via a first connecting line 16. Via its delivery-side outlet 22 the pump 14 is connected by a further connecting line 17 to a restrictor element 34. From the restrictor element a further connecting line 18 leads to an injection valve 50, which is arranged on the exhaust tract 20 of the internal combustion engine 10. The injection valve 50 comprises a housing 51, which is of trough-shaped design, and can be closed by a closing member 61 on its side facing the exhaust tract 20. On its side remote from the exhaust tract 20 the housing 51 is closed by a cover 59, which guides the closing member 61. A cooling circuit 75, which in an outer area of the injection valve 50 leads from the connecting line 18 to a valve seat 53, which with the outwardly opening closing member 61 is closed by a valve disk 54, is formed in the injection valve 50. From the valve seat 53 the cooling circuit 75 in an inner area of the injection valve 50 leads along the closing member to the cover 59. The cover 59 is connected via a return line 19 to the reservoir 13.

The pump 14 draws a volumetric flow 15 of the liquid 12 from the reservoir 13 via the connecting line 16 and delivers it via the connecting line 17 to the restrictor element 34. In the initial state the restrictor element 34 has a restricting effect, so that the volumetric flow 15 flows from the restrictor element 34 at reduced pressure via the connecting line 18 to the injection valve 50, the connecting line 18 being connected to the cooling circuit 75 of the injection valve 50. The main direction of flow of the liquid 12 represented by arrows in the drawing.

As it flows through the cooling circuit 75, the volumetric flow 15 of the liquid 12 cools the area of the valve seat 53 of the injection valve 50 particularly subjected to thermal load and flows back to the reservoir 13 via the return line 19, which is connected to the cover 59 of the injection valve 50. If the restrictor element 34 is activated in such a way that the volumetric flow 15 to the injection valve 50 is released by the restrictor element 34, a pressure of the liquid 12 acting on the closing member 61 increases in the injection valve 50. If the pressure in the injection valve 50 reaches or exceeds a threshold, which is needed in order to overcome a closing force acting on the closing member 61, the closing member 61 opens and allows a metering of the liquid 12 into the exhaust tract 20 of the internal combustion engine 10. An aqueous urea solution or a fuel, in particular diesel fuel, is suitable as liquid 12 for use in this device 100.

Alternatively the liquid 12 may also be stored in and fed to the device 100 from a pressurized circuit, for example a low-pressure circuit of a fuel injection system. In this case it is possible to dispense with the pump 14, if the pressurized circuit provides the liquid 12 with a pressure which exceeds the threshold, which is needed in order to overcome the closing force acting on the closing member 61 in the injection valve 50.

As a further alternative the injection valve 50 may also be embodied as an inwardly opening valve, in which the valve seat 53 may alternatively also be closed by a valve ball 55. In the device claimed the cooling of the injection valve 50 by the cooling circuit 75 is not limited to the area of the valve seat 53 but may also dissipate the heat from elsewhere, in particular from the housing 51 of the injection valve 50, so that a direct incident flow against the valve seat 53 is not absolutely essential. Here the cooling circuit 75 may also be arranged in the portion in the outer area of the injection valve 50 leading from the valve seat 53 to the return line 19, in particular in the housing 51. In this case the return line 19 may alternatively also be connected directly to the housing 51.

Figure 2:
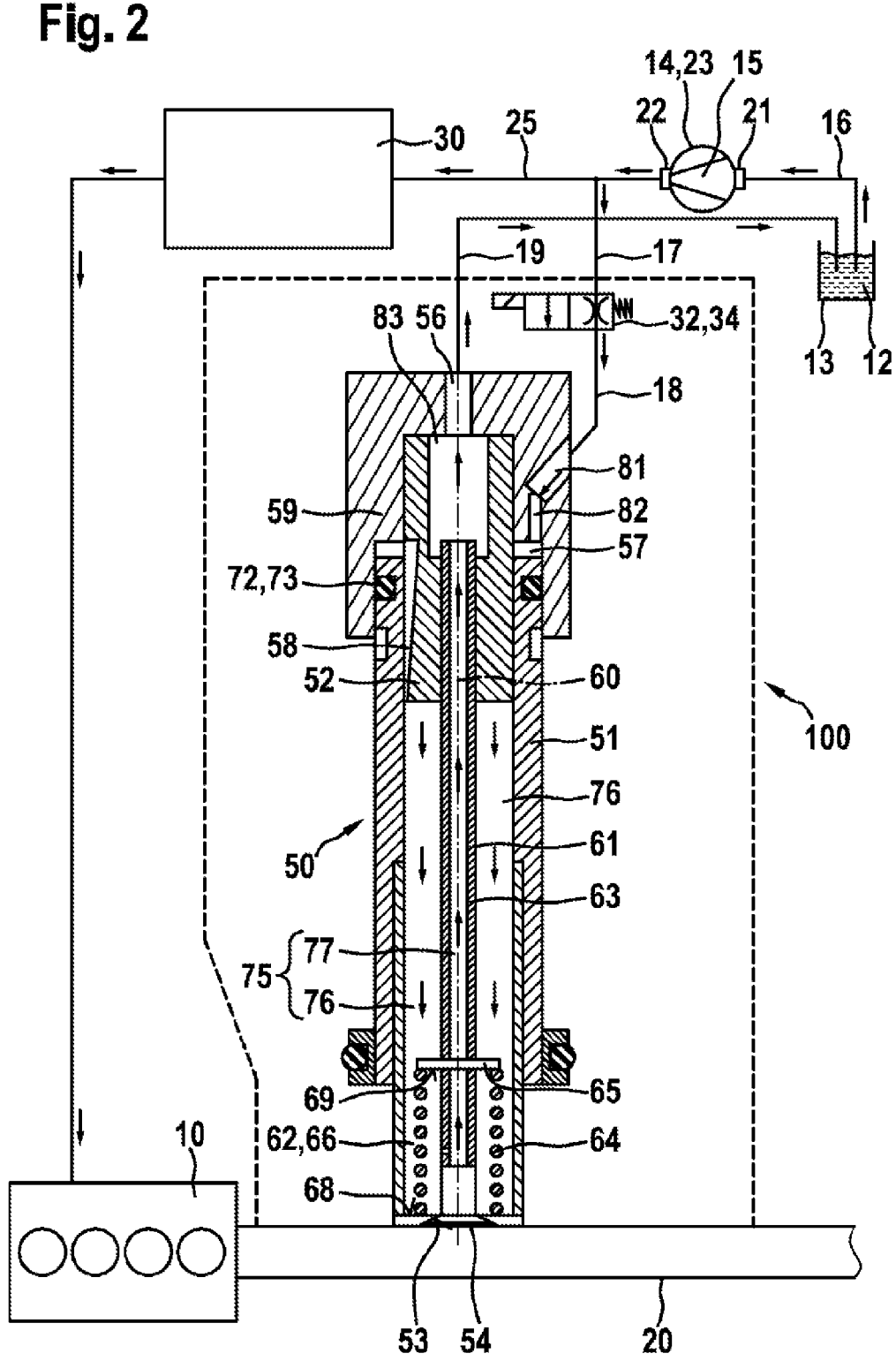
FIG. 2 shows a sectional representation of a first exemplary embodiment of the device according to the invention.

FIG. 2 shows a sectional representation of a further exemplary embodiment of the device 100 according to the invention. Here the reservoir 13 for storing the liquid 12 is connected via the first connecting line 16 to the suction-side inlet 21 of a pre-supply pump 23 of a fuel injection system 30. The pre-supply pump 23 is connected, via the further connecting line 17 to a metering valve 32 acting as restrictor element 34, and via a further connecting line 25 in a known manner to the fuel injection system 30 supplying the internal combustion engine 10. The metering valve 32 is connected via the connecting line 18 to the injection valve 50, which is arranged on the exhaust tract 20 of the internal combustion engine 10. The injection valve 50 comprises a housing 51, which is of trough-shaped design, and on its side facing the exhaust tract 20 can be closed by a closing member 61 situated on a central axis 60 of the injection valve 50. Here a valve seat 53, which can be closed by a valve disk 54 formed on the closing member 61, is formed on an end face of the housing 51 facing the exhaust tract 20. The closing member 61 is embodied as a hollow needle 63, which is guided by an insert 52, which is pressed in the cover 59. A valve spring 64 is arranged between a bearing surface 68, formed on the end face of the housing 51 facing the exhaust tract 20, and a further bearing surface 69, embodied as a spring plate 65 of the closing member 61. The connecting line 18 opens via an angled port 81 and a connecting port 82 in the cover 59 into an annular orifice 57, which is defined by the cover 59 and the housing 51. Here a sealing element 72 in the form of an O-ring 73, which seals off the injection valve 50 externally to prevent an unwanted escape of the liquid 12, is arranged between the cover 59 and the housing 51. The annular orifice 57 is hydraulically connected via a disk filter 58, which is formed by the insert 52 and the housing 51, to the cooling circuit 75, which comprises a liquid inlet 76 and a liquid return 77. In order to obtain an optimum cooling effect, the liquid inlet 76 arranged in an outer area of the injection valve 50 leads to the area of the valve seat 53 subjected to a high thermal load, whilst the liquid return 77 is arranged inside the closing member 61 embodied as a hollow needle 63. The liquid inlet 76 and the liquid return 77 are connected to one another via a further restrictor 62, which is embodied as a port 66 in the closing member 61 embodied as a hollow needle 63. The liquid return 77 is connected via an orifice 83 in the insert 52 and an orifice 56 in the cover 59 to the return line 19, which connects the injection valve 50 to the reservoir 13.

The pre-supply pump 23 of the fuel injection system 30 connected to the reservoir 13 via the connecting line 16 delivers a volumetric flow 15 of the liquid 12 to the metering valve 32 via the connecting line 17. In the initial state the metering valve 32 restricts the volumetric flow 15 to the injection valve 50, in such a way that the volumetric flow 15 of the liquid 12 is delivered to the injection valve 50 at reduced pressure via the connecting line 18, the liquid 12 flowing via the angled port 81 and the connecting port 82 out of the connecting line 18 into the annular orifice 57 of the injection valve 50. The liquid 12 passes via the disk filter 58 into the cooling circuit 75 of the injection valve 50. As it flows through the liquid inlet 76, the heat of the injection valve 50, subjected to a thermal load, is absorbed and is dissipated via the liquid return 77. In passing from the liquid inlet 76 into the liquid return 77 the liquid 12 of the port 66 flows through in the closing member 61, which is embodied as a hollow needle 63 and which acts as a further restrictor 62. Here the restriction effect of the port 66 in the initial state does not determine the rate of flow, so that only a slight pressure increase, if any, occurs in the liquid inlet 76 and the pressure in the liquid inlet is below the threshold, so that pressure is not sufficient to overcome the spring force of the valve spring 64 and to lift the valve disk 64 of the closing member 61 off from the valve seat 53 of the injection valve 50. In the initial state, therefore, no liquid 12 is metered into the exhaust tract 20 of the internal combustion engine 10. The liquid 12 flows via the liquid return 77 through the orifice 83 in the insert 52 and the orifice 56 in the cover 59 and via the adjoining return line 19 back to the reservoir 13.

If the metering valve 32, proceeding from the initial state described, is opened by electrical activation, the volumetric flow 15 of the liquid 12 to the injection valve 50 is released, the actuation of the metering valve 32 causing the volumetric flow 15 through the injection valve 50 to be limited by the port 66, acting as further restrictor 62, as it passes between the liquid inlet 76 and the liquid return 77 of the cooling circuit 75. The pressure in the injection valve 50 thereby increases in the liquid inlet 76 or, at least briefly, exceeds the threshold 28, which is sufficient to overcome the spring force of the valve spring 64. Overcoming of the spring force of the valve spring 64 causes the valve disk 54 to lift from the valve seat 53 and allows metering of the liquid 12 into the exhaust tract 20 of the internal combustion engine 10. Due to the metering or the restriction of the volumetric flow 15 by the metering valve 32, the pressure in the liquid inlet 76 dips below the threshold 28 again, so that the closing member 61 is returned into the initial position again by the valve spring 64 and the injection valve 50 closes.

Alternatively the metering valve 32 may also be actuated mechanically, pneumatically or hydraulically. The cover 59 of the injection valve 50 may alternatively also be integrally formed with the insert 52, the closing member 61 also being alternatively guided in the housing 51 and/or in the cover 59. The disk filter 58 can also possibly be dispensed with, particularly if a filter element is arranged in the connecting line 18 or in the annular orifice 57.

The sealing between the housing 51 and the cover 59 of the injection valve 50 is not limited to a sealing element 72, for example an O-ring 73, other alternatives here, for example, being to connect the cover 59 to the housing 51 by a cohesive material joint, for example by welding the cover 59 and the housing 51 together, or to connect them by positive interlock, for example by way of a sealing cone.

Figure 3:
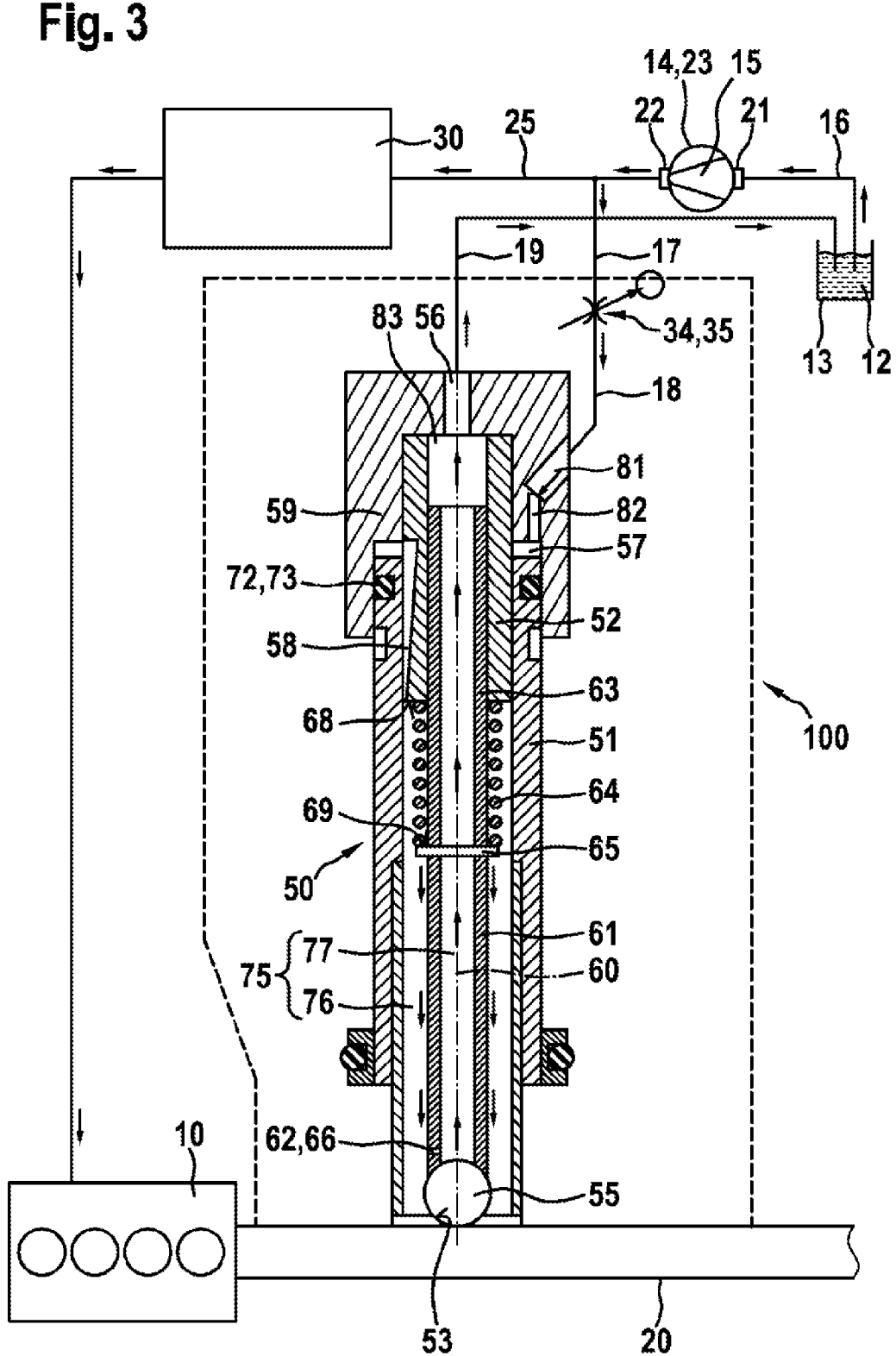
FIG. 3 shows a sectional representation of a further exemplary embodiment of the device according to the invention.

Alternatively, as shown in FIG. 3, the pre-supply pump 23 may be connected by its delivery-side outlet 22 via the connecting line 17 to a variable restrictor 35, which as restrictor element 34 is capable of limiting the volumetric flow 15 of the liquid 12 to the injection valve 50 through the connecting line 18. Here the injection valve 50 is embodied as an inwardly opening injection valve 50, the valve seat 53 in the housing 51 being closed by a valve ball 55 arranged between the closing member 61 and the valve seat 53. In the case of the inwardly opening injection valve 50, the valve spring 64 is positioned between the spring plate 65 of the closing member 61 and the insert 52 situated in the cover 59, it being possible in all exemplary embodiments for the cover 59 to be integrally formed with the insert 52. The embodiment of an inwardly opening injection valve 50 is not confined to the exemplary embodiment represented in FIG. 3, having a variable restrictor 35 between the pre-supply pump 23 and the injection valve 50, but may also be transferred to the other exemplary embodiments outlined. A cardanic action of the valve ball 55 obviates the need for a highly precise alignment of the closing member 61 in the insert 52. A further advantage accrues from the fact that an inwardly opening injection valve 50 can be configured so that opening of the injection valve gives rise to a hydraulically acting closing force, which presses the valve ball 55 back into the valve seat 53. It is thereby possible to keep a valve lift of the closing member 61 small, improving the facility for metering minute quantities of the liquid 12. Alternatively the valve ball 55 may also be integrally connected to the closing member 61.

In the exemplary embodiment sketched in FIG. 3, the volumetric flow 15 to the injection valve 50 is limited in the initial state by the variable restrictor 35, in such a way that a pressure below the threshold 28 is set in the liquid inlet 76. Here, as it flows through the cooling circuit 75, the liquid 12 does not increase the pressure, or increases it only to such a degree that the threshold is not reached and the valve ball 55 of the closing member 61, which is pressed into the valve seat 53 by the spring force of the valve spring 64, is not lifted from the valve seat 53. In the initial state the liquid 12 therefore flows via the liquid return 77 and the return line 19 back to the reservoir 13. If, from the initial state, the variable restrictor 35 is activated to open it, the volumetric flow 15 of the liquid 12 in the cooling circuit 75 of the injection valve is released in such a way that the further restrictor 66 in the closing member 61 limits the flow. As a result the pressure in the liquid inlet 76 rises above the threshold 28, so that the spring force of the valve spring 64 is overcome and the injection valve 50 allows metering of the liquid 12 into the exhaust tract 20. A narrowing of the restrictor 35 causes the pressure in the liquid inlet 76 to drop below the threshold 28 again, so that the injection valve 50 closes again. Alternatively the pressure in the liquid inlet 76 may dip below the threshold due to the metering of the liquid 12, that the injection valve 50 closes.

Figure 4:
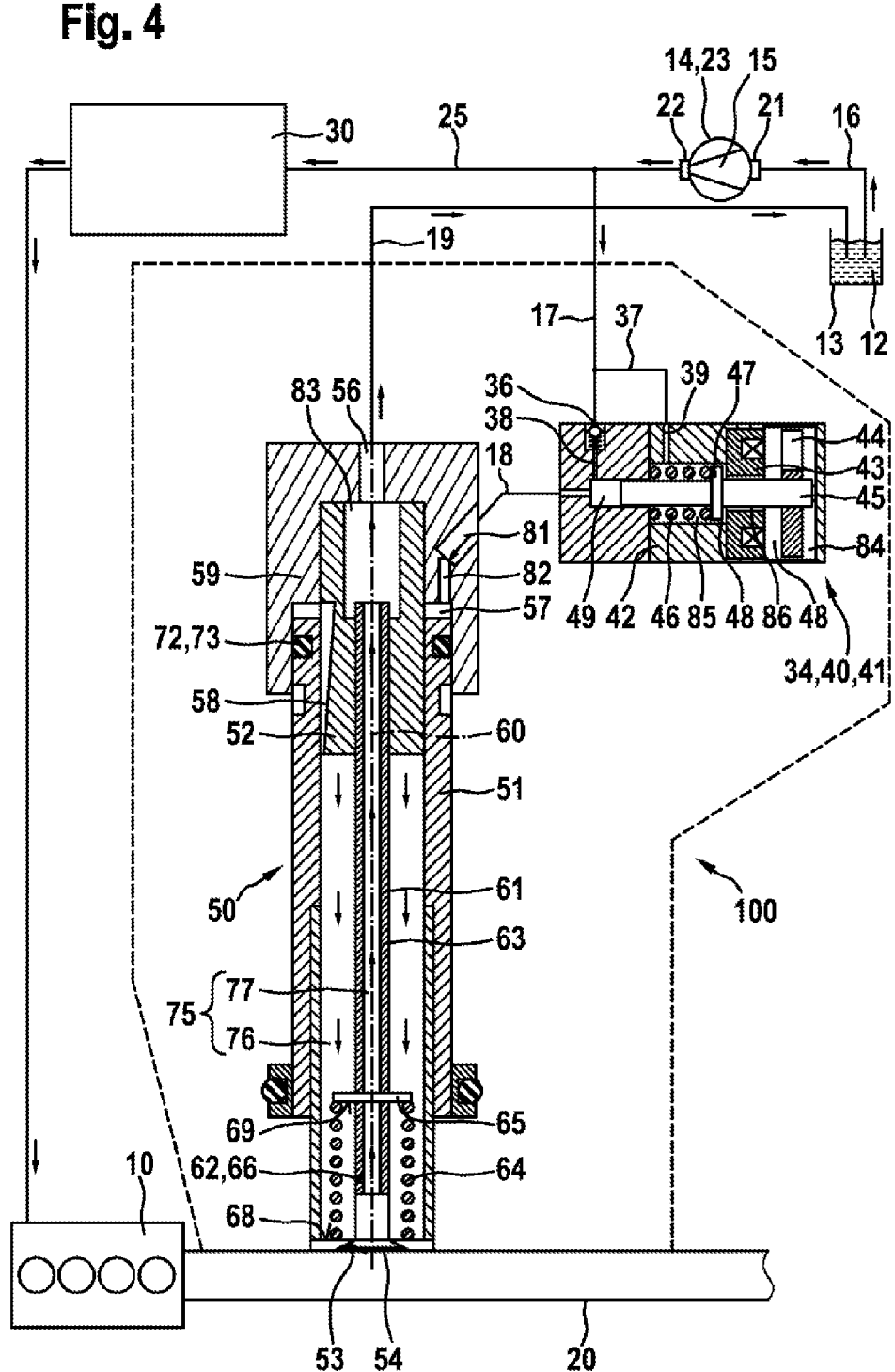
FIG. 4 shows a sectional representation of a further exemplary embodiment of the device according to the invention.

In a further exemplary embodiment represented in FIG. 4 the restrictor element 34 between the pre-supply pump 23 and the injection valve 50 is embodied as an electrically controlled metering pump 41.

The electrically controlled metering pump 41 comprises a pump housing 42, in which a pressure chamber 49 is formed, in which a pressure can be built up by a pump piston 45. The pump piston 45 is held in its initial position by a spring 46, which is arranged between the pump housing 42 and a spring plate 47 formed on the pump piston 45. The pump piston 45 additionally comprises an armature 44 integrally connected to the pump piston 45, the armature 44 being capable of actuation by a solenoid assembly 43, likewise arranged in the pump housing 42. Branching off from the connecting line 17 between the pre-supply pump 23 and the electrically controlled metering pump 41 is a connecting line 37, which is connected via a port 39 to a hydraulic working chamber 48 of the electrically controlled metering pump 41. Here the hydraulic working chamber 48 comprises a spring chamber 85 and an armature chamber 84, which are hydraulically connected to one another via a guide area 85 of the pump piston 45 formed in the pump housing 42. An inlet restrictor 38 is arranged between the connecting line 17 and the pressure chamber 49 of the electrically controlled metering pump 41. A non-return valve 36 arranged between the connecting line 17 and the pressure chamber 49 serves to prevent the liquid 12 flowing back out of the pressure chamber 49 to the pre-supply pump 23. Here the non-return valve 36 is preferably arranged upstream of the inlet restrictor 38 in the direction of flow indicated by arrows in the figures.

In the unactivated state of the metering pump 41, the pre-delivery pump 23 delivers the liquid 12 into the pressure chamber 49 of the electrically controlled metering pump 41 via the non-return valve 36 and the inlet restrictor 38. Here the pressure of the pre-supply pump 23 is sufficient to overcome the spring force of the non-return valve 36 and to open the non-return valve 36. When the metering pump 41 is not activated, the pump piston 45 is pressure-balanced, since the hydraulic working chamber 48 of the electrically controlled metering pump 41 is hydraulically connected to the pre-supply pump 23 via the connecting line 37 and the port 39 in the housing 42. The pump piston 45 is positioned in its initial position by the spring 46. In the unactuated initial state of the electrically controlled metering pump 41 the liquid 12 circulates, as described in the preceding exemplary embodiments, through the cooling circuit 75 of the injection valve 50, thereby cooling the injection valve 50. If the solenoid assembly 43 of the electrically controlled metering pump 41 is activated, the armature 44 is pulled up by the magnetic force of the solenoid assembly 43, overcoming the spring force of the spring 46 and causing the pump piston 45 to move in the direction of the pressure chamber 49. As a result the pressure in the pressure chamber 49 increases. The non-return valve 36 closes due to the pressure increase in the pressure chamber 49, preventing the liquid 12 from flowing back into the reservoir 13 counter to the direction of flow. Due to the pressure increase in the pressure chamber 49, the pressure in the liquid inlet 76 of the cooling circuit 75 also increases. If the pressure in the liquid inlet 76 reaches or exceeds the threshold, the injection valve 50 opens and allows metering of the liquid 12 into the exhaust tract 20 of the internal combustion engine 10. Due to the injection, the pressure in the liquid inlet 76 is reduced, so that the pressure again falls below the threshold when the pump piston 45 of the electrically controlled injection valve 41 has reached its limit position and no further pressure is being built up in the pressure chamber 49. When the energizing of the solenoid assembly 43 ceases, the pump piston 45 is returned to its initial position again by the spring 46 and the non-return valve 36 opens again, so that the pressure chamber 49 is again filled with liquid 12.

Alternatively, instead of a magnetic circuit, which comprises the solenoid assembly 43 and the armature 44, the electrically controlled metering pump 41 may also be controlled by a piezo-actuator. The invention is not limited to piston pumps; alternatively it is also possible to use other metering pumps 40, for example diaphragm pumps or centrifugal pumps, which in the unactivated operating state restrict the volumetric flow 15 of the liquid 12 to the injection valve 50 and therefore allow a flow through the cooling circuit 75 in the injection valve 50, and which in the activated state release the volumetric flow 15 of the liquid 12 to the injection valve, at least to a degree sufficient for the pressure in the liquid inlet 76 of the injection valve 50 to build up, at least until it reaches the threshold.

The device according to the invention is likewise not limited to electrically controlled metering pumps 41 but also encompasses metering pumps 40, which are activated pneumatically, hydraulically or mechanically, for example.

As an alternative to pressure-balanced metering pumps, it is also possible to use metering pumps 40 in which, in the unactivated initial state, different pressures prevail in the hydraulic working chamber 48 and in the pressure chamber 49, making it possible to dispense with the connecting line 37 and the port 39 in the pump housing 42. As a further embodiment the pump piston 45 and the armature 44 may also be of two-part design.

The invention claimed is:

1. A device (100) for metering a liquid (12) into an exhaust tract (20) of an internal combustion engine (10), wherein the device (100) comprises at least one injection valve (50) that can be closed by abutting a closing member (61) against a valve seat (53) and that has a cooling circuit (75) for regulating the temperature in the injection valve (50), wherein the liquid (12) is supplied by a pump (14), to the cooling circuit (75), through a supply line (16, 17, 18), wherein a restrictor element (34), distinct from the pump (14), is connected upstream of the injection valve (50) for closed-loop or open-loop quantity control of a volumetric flow (15) of the liquid (12) through the cooling circuit (75) of the injection valve (50), wherein the injection valve (50) is closed and the volumetric flow (15) of the liquid (12) flows through the restrictor element (34) to the valve seat (53) when the restrictor element (34) restricts the volumetric flow (15) of the liquid (12) to the injection valve (50), wherein the injection valve (50) opens when the restrictor element (34) releases the volumetric flow (15) of the liquid (12) to the injection valve (50), and wherein the injection valve (50) comprises a further restrictor (62) distinct from the valve seat (53) and arranged in the cooling circuit (75), which has a greater restricting effect than the restrictor element (34) when a line cross section (16) in the restrictor element (34) is fully released.

2. The device as claimed in claim 1, wherein a first operating state, in which the restrictor element (34) determines the volumetric flow (15) through the cooling circuit (75) of the injection valve (50), is succeeded by a second operating state, in which a pressure in the injection valve (50) increases when the volumetric flow (15) to the injection valve is released and is restricted by the further restrictor (62) in the injection valve (50), and the injection valve (50) opens when the pressure reaches or exceeds a threshold (28).

3. The device as claimed in claim 1, wherein the closing member (61) is embodied as a hollow needle (63).

4. The device as claimed in claim 1, wherein the restrictor element (34) comprises a metering pump (40), a variable restrictor (35) and/or a metering valve (32).

5. The device as claimed in claim 4, wherein the metering pump (40), in a deactivated operating state of the metering pump (40), restricts but does not fully block the volumetric flow (15) to the injection valve (50).

6. The device as claimed in claim 1, wherein the cooling circuit (75) comprises a liquid inlet (76) and a liquid return (77), the liquid return (77) being arranged in proximity to a central axis (60) of the injection valve (50) inside the closing member (61).

7. The device as claimed in claim 1, wherein a disk filter (58) is formed in a housing (51) of the injection valve (50) or between the housing (51) and an insert (52) guiding the closing member (61), between a feed line (18) and the cooling circuit (75) of the injection valve (50).

8. The device as claimed in claim 1, wherein the cooling circuit (75) of the injection valve (50) cools the valve seat (53) of the injection valve (50).

9. A method for metering a liquid (12) into an exhaust tract (20) of an internal combustion engine (10), wherein an injection valve (50) can be closed by abutting a closing member (61) against a valve seat (53), and the injection valve (50) comprises a cooling circuit (75) for regulating the temperature in the injection valve (50), wherein the liquid (12) is supplied by a pump (14), to the cooling circuit (75), through a supply line (16, 17, 18), wherein a restrictor element (34), distinct from the pump (14), is connected upstream of the injection valve (50) for closed-loop or open-loop quantity control of a volumetric flow (15) of the liquid (12) through the cooling circuit (75) of the injection valve (50), wherein the injection valve (50) is closed and the volumetric flow (15) of the liquid (12) flows through the restrictor element (34) to the valve seat (53) when the restrictor element (34) restricts the volumetric flow (15) of the liquid (12) to the injection valve (50), wherein the injection valve is opened when the restrictor element (34) releases the volumetric flow (15) of the liquid (12) to the injection valve (50), and wherein the injection valve (50) comprises a further restrictor (62) distinct from the valve seat (53) and arranged in the cooling circuit (75), which has a greater restricting effect than the restrictor element (34) when a line cross section (16) in the restrictor element (34) is fully released.

10. The method of claim 9, wherein the liquid (12) is a fuel.

11. The device as claimed in claim 1, wherein the liquid (12) is a fuel.

12. The device as claimed in claim 4, wherein the metering pump (40) is an electrically controlled metering pump (41).

13. A device (100) for metering a liquid (12) into an exhaust tract (20) of an internal combustion engine (10), wherein the device (100) comprises at least one injection valve (50) that can be closed by a closing member (61) and that has a cooling circuit (75) for regulating the temperature in the injection valve (50), and wherein a restrictor element (34) is connected upstream of the injection valve (50) for closed-loop or open-loop quantity control of a volumetric flow (15) of the liquid (12) through the cooling circuit (75) of the injection valve (50), wherein the injection valve (50) opens when the restrictor element (34) releases the volumetric flow (15) of the liquid (12) to the injection valve (50), wherein the cooling circuit includes a supply line (16, 17, 18) and a return line (19), and wherein the closing member (61) is embodied as a hollow needle (63) through which the liquid (12) is transferred to the return line (19).

14. The device as claimed in claim 13, wherein the injection valve (50) comprises a further restrictor (62) arranged in the cooling circuit (75), which has a greater restricting effect than the restrictor element (34).

15. The device as claimed in claim 14, wherein a first operating state, in which the restrictor element (34) determines the volumetric flow (15) through the cooling circuit (75) of the injection valve (50), is succeeded by a second operating state, in which a pressure in the injection valve (50) increases when the volumetric flow (15) to the injection valve is released and is restricted by the further restrictor (62) in the injection valve (50), and the injection valve (50) opens when the pressure reaches or exceeds a threshold (28).

16. The device as claimed in claim 13, wherein the restrictor element (34) comprises a metering pump (40), a variable restrictor (35) and/or a metering valve (32).

17. The device as claimed in claim 16, wherein the metering pump (40), in a deactivated operating state of the metering pump (40), restricts but does not fully block the volumetric flow (15) to the injection valve (50).

18. The device as claimed in claim 13, wherein the cooling circuit (75) comprises a liquid inlet (76) and a liquid return (77), the liquid return (77) being arranged in proximity to a central axis (60) of the injection valve (50) inside the closing member (61).

19. The device as claimed in claim 13, wherein a disk filter (58) is formed in a housing (51) of the injection valve (50) or between the housing (51) and an insert (52) guiding the closing member (61), between the supply line (16, 17, 18) and the cooling circuit (75) of the injection valve (50).

* * * * *